Figure 1:
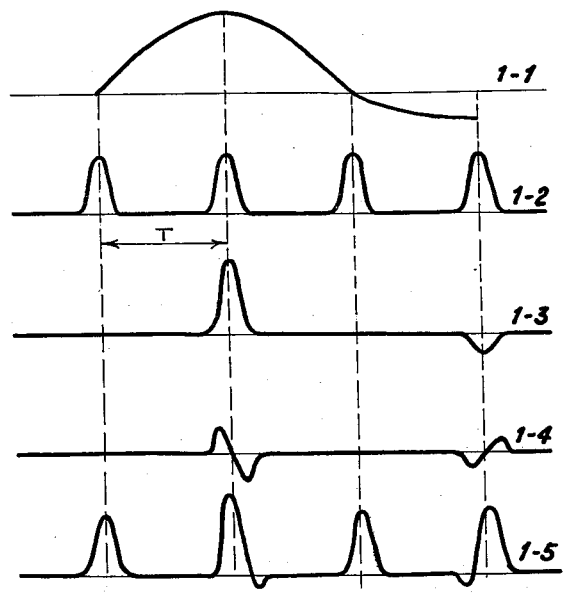

Feb. 28, 1961   J. R. V. OSWALD   2,973,409
TELECOMMUNICATION SYSTEM
Original Filed March 1, 1952   2 Sheets-Sheet 1

Inventor:
Jacques, Regis, Victor Oswald
By:
Michael S. Struker
agt.

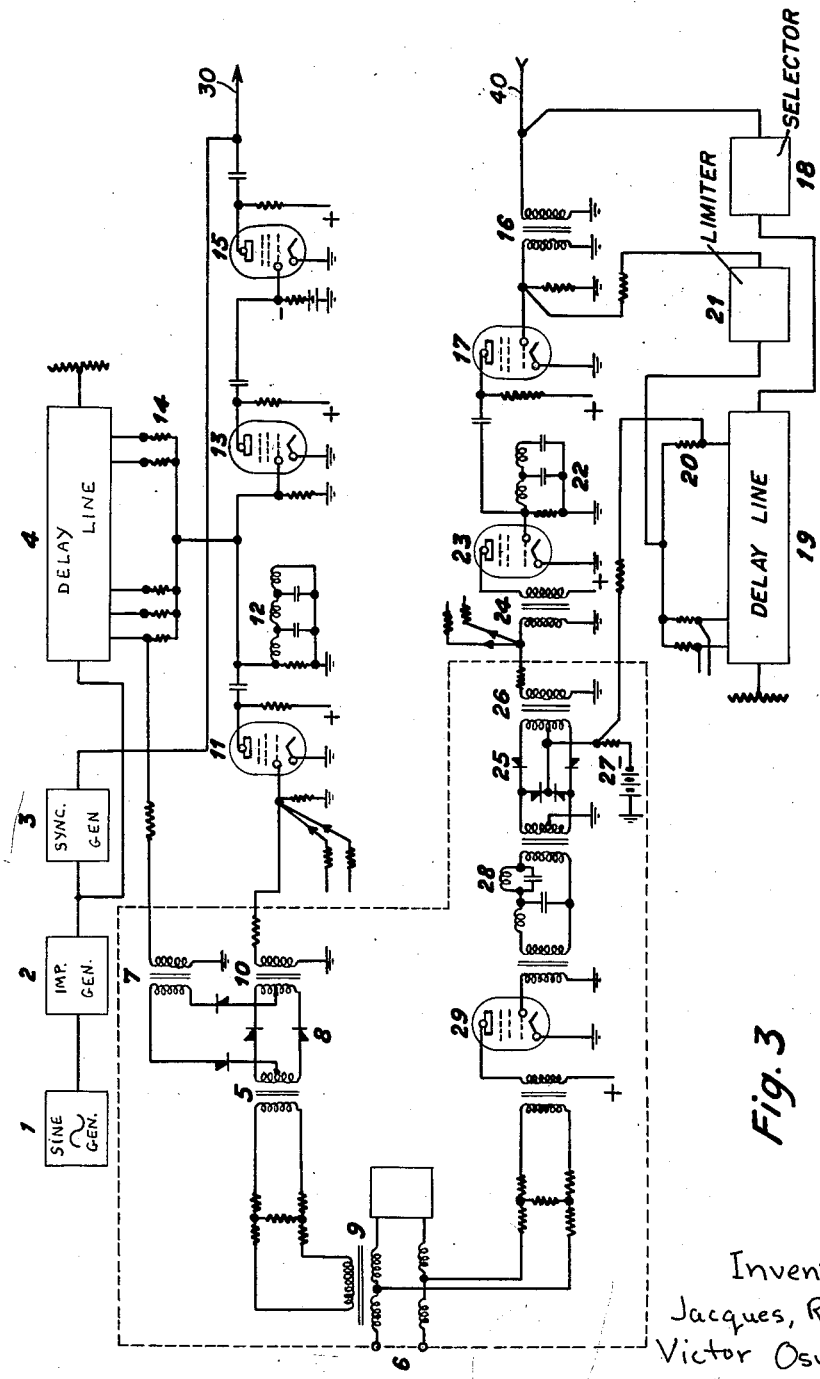

United States Patent Office 2,973,409
Patented Feb. 28, 1961

2,973,409
TELECOMMUNICATION SYSTEM

Jacques Regis Victor Oswald, Paris, France, assignor to Compagnie Industrielle des Telephones, Paris, France, a corporation of France Original application Mar. 1, 1952, Ser. No. 274,373, now Patent No. 2,785,227, dated Mar. 12, 1957. Divided and this application May 10, 1955, Ser. No. 507,454

1 Claim. (Cl. 179—15)

The present invention relates to a method of modulation and demodulation for pulse-type telecommunication system, employing the so-called "position" or "time shift" modulation and particularly for multiplex systems. This application is a divisional application of U.S. application Serial No. 274,373 filed March 1, 1952, now Pat. #2,785,227 issued March 12, 1957.

The principle employed in multiplex systems consists, as is well-known, in transmitting a series of impulses corresponding to the different channels, in the order of said channels, a special synchronising impulse fixing the period of repetition. The position modulation has the effect of causing a displacement of the impulse in relation to its reference position, which displacement is in proportion to the amplitude of the signal to be transmitted.

In the majority of known modulation systems, position-modulated impulses are obtained by differentiating duration-modulated impulses, for example by means of a condenser and a resistance. The duration-modulation is itself obtained from an amplitude-modulated impulse, which undergoes a suitable deformation by means of a time-constant device.

The method of modulation according to the invention makes it possible to obtain position-modulated impulses from amplitude-modulated impulses, without passing through the intermediate stage of time modulation.

The object of the present invention is a method of position modulation for a pulse-type telecommunication system, characterised in this, that the position modulation is obtained directly from an amplitude modulation, by addition to a first series of fixed impulses representing the original impulses before modulation, of a second series of impulses obtained by effecting the differentiation, in relation to time, of the first series of impulses after they have been amplitude-modulated.

The demodulation is obtained by addition to the series of position-modulated impulses of a series of fixed impulses of opposite polarity, and by integration, in relation to time, of the signals obtained in this way.

The principle employed is the result of a mathematical expression indicated hereinafter:

Let an electrical impulse be of any form, capable of being represented by a continuous function of time $f(t)$ which has a differential coefficient for all values of $t$. Any series of $2p+1$ identical and equidistant impulses may be written:

$$y(t) = \sum_{k=-p}^{p} f(t-t_k) = \sum_{k=-p}^{p} f(t-kT)$$

designating by the $t_k = kT$ the characteristic time unit of the $k$th impulse and by T the period of repetition.

Let $x(t)$ be any signal representing the modulation to be transmitted; in the time unit $t_k$, $x(t)$ has the value $x_k = x(t_k)$.

The amplitude modulation in pulses will cause the following series to correspond to $y(t)$:

$$y_a(t) = \sum_{-p}^{p} x_k f(t-t_k)$$

In position-modulation, it is the characteristic time-unit $t_k = kT$ which is modified in proportion to $x_k$ and becomes:

$$t'_k t_k + \lambda T x_k = (k + \lambda x_k) T$$

$\lambda$ designating a constant factor, which may be called rate of modulation and which characterises the displacement to which the impulse is subjected. We then have the series:

$$Z(t) = \sum_{k=-p}^{p} f(t - t'_k) = \sum_{-p}^{p} f(t - t_k - \lambda T x_k)$$

In practice, in nearly all cases the maximum displacement undergone by the impulse $\lambda T x_{max}$ is very slight in relation to the period of repetition T (for example 0.01T or 0.02T).

If we develop $z(t)$ in Taylor series, only keeping the terms of the first order we get:

$$Z(t) = \sum_{-p}^{p} f(t - t_k - \lambda T x_k)$$

$$= \sum_{-p}^{p} f(t-t_k) - \lambda T \sum_{-p}^{p} x_k \left(\frac{df}{dt}\right) t - t_k$$

$$= \sum_{-p}^{p} f(t-t_k) - \lambda T \frac{d}{dt}\left[\sum_{-p}^{p} x_k f(t-t_k)\right] Z(t)$$

$$= y(t) - \lambda T \frac{d}{dt} y_a(t)$$

The result may be expressed in this way:

A series of position-modulated impulses, with a displacement which is slight in relation to the period of repetition, may be considered as the sum of two terms: the first term represents the series of unmodulated impulses, the second is in proportion to the derivative in relation to time of the series of the same impulses after they have been modulated in amplitude.

From this result it is possible to infer the method of modulation and demodulation which is characteristic of the invention:

For the modulation, a series of fixed impulses is used, which take two paths. In the first they are modulated in amplitude, then differentiated in relation to time. In the second path they are unchanged. The ends of the two paths are interconnected so as to bring about the superposition of the two series of signals, which supplies a series of position-modulated impulses.

For the demodulation, the reverse procedure is adopted: the series of position-modulated impulses is mixed with a series of fixed impulses, obtained from the synchronising impulses, the polarities being opposite. Then the series of impulses obtained is integrated, considered as a function of time, which supplies a series modulated either in amplitude or in duration. In either case, the restoration of the modulation signal is effected, as is well known, by a simple filtering by a low pass filter.

Figure 2:
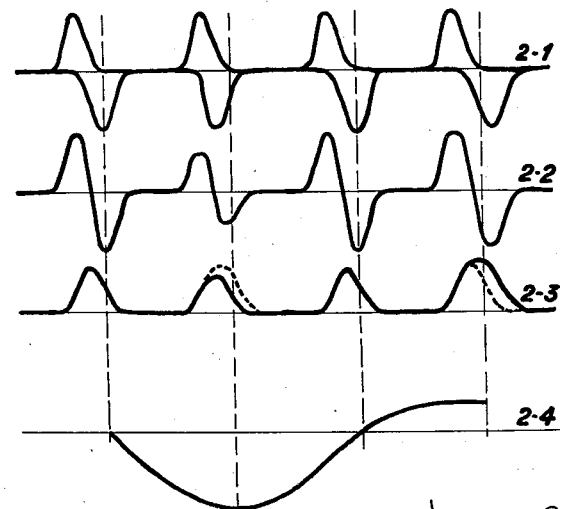

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1, including Sub-Figures 1.1 to 1.5, represents the transformations undergone by the impulses in the process of modulation;

Fig. 2, including Sub-Figures 2.1 to 2.4, represents process of demodulation; and Fig. 3 is an electrical schematic diagram of a multiplex system using the modulation and demodulation operations of the present invention.

Referring to the figures, and more particularly to Fig. 1, Fig. 1.1 represents the low frequency signal to be transmitted. Fig. 1.2 represents the series of unmodulated impulses, separated by the interval T. The product of the impulses of Fig. 1.2 with the signal of Fig. 1.1 supplies the amplitude modulated impulses shown in Fig. 1.3.

When the amplitude modulated impulses of Fig. 1.3 are differentiated with respect to time, the series of impulses shown in Fig. 1.4 results in the impulse series shown in Fig. 1.5. It is apparent that the impulses in Fig. 1.5 are modulated in position with respect to the impulses of Fig. 1.2. In Fig. 1.5 a parasitic amplitude modulation is present which may be easily eliminated by the use of suitable limiting devices.

Referring now to Fig. 2 the process of demodulation will be described. In Fig. 2.1 the positive impulses are the fixed reference impulses which are generated from the synchronizing impulses. The negative impulses shown in Fig. 2.1 are the position modulated channel impulses. The sum of these negative and positive impulses provide the series of impulses shown in Fig. 2.2.

The integration of the series of impulses of Fig. 2.2 supplies the series 2.3 which is modulated in amplitude and in duration. It is clear that by limiting or by suitable selection of the impulses it is possible to obtain impulses which are modulated only in duration or only in amplitudes. Such an operation, however, is unnecessary because the spectrum of the modulation signal is present in the series of impulses in Fig. 2.3 so that a low frequency signal, such as shown in Fig. 2.4 can be obtained merely by using a low pass filter.

It should be noted that the series of impulses shown in Fig. 2.2 is already duration modulated. However, the integration of these impulses makes it possible to disregard, to a certain extent, the relative position of the two series of impulses shown in Fig. 2.1. Where the positive and negative impulses do not interfere, the integration supplies impulses modulated in duration, while direct demodulation of the series of impulses in Fig. 2.2 is not possible without considerable distortion. In addition, the demodulation process described is exactly reciprocable to the modulation processes.

One of the advantages of the method of modulation and demodulation carried out by the present invention is that it is not dependent on the characteristics of electronic tubes. In effect, the operations of differentiation and integration are effected solely by means of passive networks, comprising inductances, capacitances and resistances. It is not necessary to use tubes having a well-defined polarization as is the case in the majority of the known arrangements.

Referring now to Fig. 3, the portion $d$ in discontinuous lines, represents the members belonging to one channel of the multiplex system, while the portion outside this dotted line represents the members common to all of the channels. In this figure 1 represents a generator of sinusoidal oscillations from which an impulse generator 2 supplies a series of impulses of repetition period T. This series energizes on the one hand a generator 3 of pilot synchronising impulses, on the other hand a delay line 4 from the taps of which the impulses allotted to the various channels are taken. The channel impulse is applied through a transformer 7 to a balanced channel modulator 8 including for example, rectifiers and supplying an amplitude modulation without carrier wave.

The audio frequency signals (Fig. 1.1) coming from a line 6 are applied to the input transformer 5 of the channel modulator 8 by means of a balanced differential transformer (hybrid coil) 9. A transformer 10 supplies amplitude modulated impulses without carrier wave. The elimination of the carrier wave, although not necessary, is desirable in order to obtain the maximum rate of modulation. The mixture of impulses supplied by the various channels is effected on the control grid of a pentode 11. The product of these impulses (Fig. 1.3) is differentiated by means of a short-circuited delay line 12 (or by means of a suitable capacity-resistance system). A tube 13 receives all of the differentiated impulses (Fig. 1.4) on the one hand, and all of the fixed impulses coming from the delay line 4 on the other hand; the coupling being effected through mixer resistances 14. A limiter tube 15 limits the impulses obtained which are then mixed with the synchronising impulse from synchronising generator 3 on the output of the transmitting device.

At the receiving end, the received impulses are transmitted with suitable polarity, by means of transformer 16 to the control grid of a tube 17. A selector 18 isolates the synchronising impulse which is sent through a delay line 19 to produce the fixed channel selection impulses. These impulses are also mixed through resistances 20 and then brought back if necessary to the suitable amplitude by a limiter or potentiometer device 21 before being applied to the control grid of the tube 17. An open circuited delay line 22 (or any other device with capacity-resistance or inductance-resistance) integrates the signals supplied by the tube 17 and an amplifier 23 applies, by means of a transformer 24, the integrated signals to the different channels placed in parallel. A suitable selector 25 (for example a blocking selector with rectifiers) selects the channel impulse when all of the integrated signals are applied to it via a transformer 26 and the selection impulse corresponding to the channel is applied to a resistance 27 from the delay line 19. The selected impulse is demodulated by a low-pass filter 28 and the audio signals amplified by a tube 29 are applied to the termination 9 of the two-wire line 6.

I will be understood that each of the elements described above, or two or more together, may also find a useful application in other types of modulation differing from the types described above.

While the invention has been illustrated and described as embodied in a method and apparatus for modulation and demodulation for pulse-type telecommunication, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapte it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

A pulse-type telecommunication system involving a plurality of transmitting and receiving channels, comprising, in comibnation, an electrical current impulse generator for generating, at predetermined time intervals, electrical current impulses capable of being represented by a continuous function of time, which has a differential coefficient for all values of time; a modulator arranged in each transmitter channel and having first, second, and output terminal means, said modulator being electrically connected at said first terminal means thereof to the output of said electrical current impulse generator, and adapted to be connected at said second terminal means thereof to a source of voice currents so that said current impulses generated by said current impulse generator may be amplitude modulated by said voice currents; a differentiator circuit common to all transmitting channels and electrically connected to said output terminal means of said modulator for differentiating the amplitude modulated current impulses; a mixer circuit common to all transmitting channels, said mixer having input and output terminals and being electrically connected at its input terminals to the output of said current impulse generator and to the output of said differentiator circuit for superimposing the two outputs whereby a series of position modulated electrical current impulses are obtained for transmission to a suitable receiving device; a generator in each of said transmission channels and being electrically connected to the output of said electrical current impulse generator for generating electrical current pilot synchronizing pulses, the latter pulses being transmitted together with said position modulated electrical current impulses; means for transmitting said position modulated electrical current impulses together with said electrical current pilot synchronizing pulses; and a receiver for demodulating said transmitted pulses to obtain the desired voice frequencies.

References Cited in the file of this patent
UNITED STATES PATENTS

| | | |
|---|---|---|
| 2,447,233 | Chatterjea, et al. | Aug. 17, 1948 |
| 2,471,138 | Bartelink | May 24, 1949 |
| 2,497,411 | Krumhausl | Feb. 14, 1950 |
| 2,513,308 | Grieg | July 4, 1950 |